United States Patent
Pomerance et al.

(10) Patent No.: US 9,188,666 B2
(45) Date of Patent: Nov. 17, 2015

(54) SYSTEM AND METHOD FOR DISTRIBUTION FREE TARGET DETECTION IN A DEPENDENT NON-GAUSSIAN BACKGROUND

(71) Applicant: RAYTHEON APPLIED SIGNAL TECHNOLOGY, INC., Sunnyvale, CA (US)

(72) Inventors: Andrew J. Pomerance, Alexandria, VA (US); Richard Hugh Anderson, Fredericksburg, VA (US); Kurt James Lightner, Baltimore, MD (US); Katherine S. H. Johnson, Leesburg, VA (US)

(73) Assignee: Raytheon Applied Signal Technology, Sunnyvale, CA (US)

( * ) Notice: Subject to any disclaimer, the term of this patent is extended or adjusted under 35 U.S.C. 154(b) by 274 days.

(21) Appl. No.: 13/912,596

(22) Filed: Jun. 7, 2013

(65) Prior Publication Data

US 2014/0361919 A1 Dec. 11, 2014

(51) Int. Cl.
*G01S 7/292* (2006.01)
*G01S 7/285* (2006.01)
*G01S 13/00* (2006.01)

(52) U.S. Cl.
CPC ............. *G01S 13/006* (2013.01); *G01S 7/2923* (2013.01); *G01S 7/2927* (2013.01)

(58) Field of Classification Search
CPC ............. G01S 7/02; G01S 7/28; G01S 7/285; G01S 7/292; G01S 7/2923; G01S 7/2927; G01S 13/006
USPC ........ 342/27, 28, 89–103, 159–164, 175, 195
See application file for complete search history.

(56) References Cited

U.S. PATENT DOCUMENTS

| | | | |
|---|---|---|---|
| 4,422,074 A | 12/1983 | Williams et al. | |
| 7,990,311 B2 | 8/2011 | Pauli et al. | |
| 8,026,842 B2 * | 9/2011 | Fox et al. | 342/90 |
| 8,160,837 B2 * | 4/2012 | Cormode et al. | 342/90 |
| 8,405,540 B2 * | 3/2013 | Porikli | 342/90 |

OTHER PUBLICATIONS

Craiu, et al, "In Mixed Company: Bayesian Inference for Bivariate Conditional Copula Models With Discrete and Continuous Outcomes", journal of Multivariate Analysis, vol. 110, Sep. 1, 2012 (pp. 106-120).

Dzvonkovskaya, et al., "CFAR Target Detection Based on Gumbel Distribution for HF Radar", International Radar Symposium, IRS 2006, IEEE Piscataway, NJ, USA May 1, 2006 (pp. 1-4).

Written Opinion of the International Searching Authority for International Application No. PCT/US2014/036115 filed Apr. 30, 2014, Written Opinion of the International Searching Authority mailed Sep. 9, 2014 (7 pgs.).

International Search Report for International Application No. PCT/US2014/036115 filed Apr. 30, 2014, International Search Report dated Sep. 2, 2014 and mailed Sep. 9, 2014 (4 pgs.).

\* cited by examiner

*Primary Examiner* — Bernarr Gregory
(74) *Attorney, Agent, or Firm* — Christie, Parker & Hale, LLP

(57) ABSTRACT

A method for target detection includes: receiving input data via an input signal; generating a histogram from the received data by a processor; rank-ordering the received data based on power or amplitude of the received input signal; comparing the ranked data received in a current time period to the ranked data received in a previous time period to calculate a Bivariate Conditional Exceedance function (BCEF); utilizing the calculated BCEF to estimate a Gumbel Copula parameter; accumulating a log-likelihood statistic from the estimated Gumbel Copula parameter and the generated histogram; comparing the log-likelihood statistic with a threshold value; and determining a detection of the target, when the log-likelihood statistic is below the threshold value.

16 Claims, 3 Drawing Sheets

SYSTEM AND METHOD FOR DISTRIBUTION FREE TARGET DETECTION IN A DEPENDENT NON-GAUSSIAN BACKGROUND

FIELD OF THE INVENTION

The present invention relates generally to a system and method for distribution free target detection in a dependent non-Gaussian background.

BACKGROUND

While trying to detect small or slow-moving targets, the target detection ability of a radar platform, such as a ground moving radar or a maritime surface search radar minimum detectable velocity, is limited by the radar dwell duration azimuth-Doppler extent of any clutter in the background. A basic problem with utilizing the data produced by such radars is that the desired information, such as radar scattering from a person or small vessel, can be obscured by clutters due to radar reflections from the clutters.

The problem is exacerbated by factors such as short duration dwells, wind-blown ground clutter, rain clutter, and bird-flock clutter and radio frequency interference (RFI). It can be difficult to separate target from clutter returns when the clutter is spread in Doppler, in which target and clutter returns overlap in Doppler. The clutter (and other non-target signals) can be Doppler spread due to factors such as: radar platform motion; the nature of the clutter, such as whether it is wind blow, rain, bird flock, sea, etc.; or other factors such as miscalibration and RFI. The target trackers or clutter maps can be overwhelmed by a very large number of clutter-hit detections. Furthermore, for a small size target, it becomes increasingly difficult to distinguish the target from the non-stationary clutter radar return signal.

Most textbook target detection techniques assume a target embedded in independent, Gaussian noise. However, many real-world problems do not conform to these assumptions, such as detection of small targets in sea clutter.

A traditional technique to detect endo-clutter targets is Space-Time Adaptive Processing (STAP). The STAP technique combines adaptive beamforming and adaptive Doppler filtering into a single 2-D algorithm to yield 2-D detection weights for a target at each candidate azimuth and Doppler. A primary disadvantage of this method is that determination of adaptive weights requires stationary interference and training data that adequately captures the space-time correlation of such interference. Performance of STAP may be deleteriously impacted by signal interference that is difficult to train on, such as non-stationary clutter and terrain bounced interference. Furthermore, the STAP method requires large number of radar return snapshots for training.

Accordingly, it is desirable to provide a method and system for reducing the effects of clutters to provide increased performance for radars.

SUMMARY OF THE INVENTION

In some embodiments, the present invention is a method for target detection. The method includes: receiving input data via an input signal; generating a histogram from the received data by a processor; rank-ordering the received data based on power or amplitude of the received input signal; comparing the ranked data received in a current time period to the ranked data received in a previous time period to calculate a Bivariate Conditional Exceedance function (BCEF); utilizing the calculated BCEF to estimate a Gumbel Copula parameter; accumulating a log-likelihood statistic from the estimated Gumbel Copula parameter and the generated histogram; comparing the log-likelihood statistic with a threshold value; and determining a detection of the target, when the log-likelihood statistic is below the threshold value.

In some embodiments, the present invention is a method for target detection. The method includes: receiving input data via an input signal; generating a histogram from the received data, by a processor; calculating a BCEF from data received in a current time period and data received in a previous time period; accumulating a log-likelihood statistic from the generated histogram; and determining a detection of the target from the log-likelihood statistic.

In some embodiments, the histogram is generated from the received data by counting the number of data samples that have amplitude between edges of a series of bins to estimate a probability distribution function of the amplitude. In some embodiments, the threshold value is adaptively changed to control the number of false detections, or is fixed.

DETAILED DESCRIPTION

In some embodiments, the present invention is a general, distribution-free technique for detecting targets in a dependent, non-Gaussian background. The present invention models and measures the background clutter and then detects the (small) target. Simulation studies of the detection performance of the invention in a sea clutter model show better than 10 dB improvement in high and medium clutter cases, and the technique is sufficiently general for application to many cases of long-tailed, dependent clutter. The process according to present invention may be executed on a general purpose computer, a special purpose computer, or dedicated hardware, for example, a field programmable gate array (FPGA), or any application specific integrated circuit (ASIC) on a radar platform.

In some embodiments, the present invention utilizes a histogram as an empirical, non-parametric estimate of the log-likelihood. The invention then uses a Gumbel copula for target detection in long-tailed, upper tail-dependent background processes by an efficient estimation of the Gumbel copula parameter with Bivariate Conditional Exceedance function (BCEF). The BCEF is a non-parametric joint order statistic to measure statistical dependence of threshold exceedances.

In probability theory and statistics, a copula is a kind of distribution function. More specifically, Copulas are distribution free measures of statistical dependence between random variables handled via the cumulative distribution functions. Copulas are used to describe the dependence between random variables. The cumulative distribution function of a random vector can be written in terms of marginal distribution functions and a copula. The marginal distribution functions describe the marginal distribution of each component of the random vector and the copula describes the dependence structure between the components.

Copulas are popular in statistical applications as they allow one to easily model and estimate the distribution of random vectors by estimating marginals and copula separately. There are many parametric copula families available, which usually have parameters that control the strength of dependence. The copula functions can be broadly categorized in one-parameter copulas as the Gaussian copula, and the Archimedean copula, which comprises Gumbel, Clayton and Frank copulas.

Figure 1:
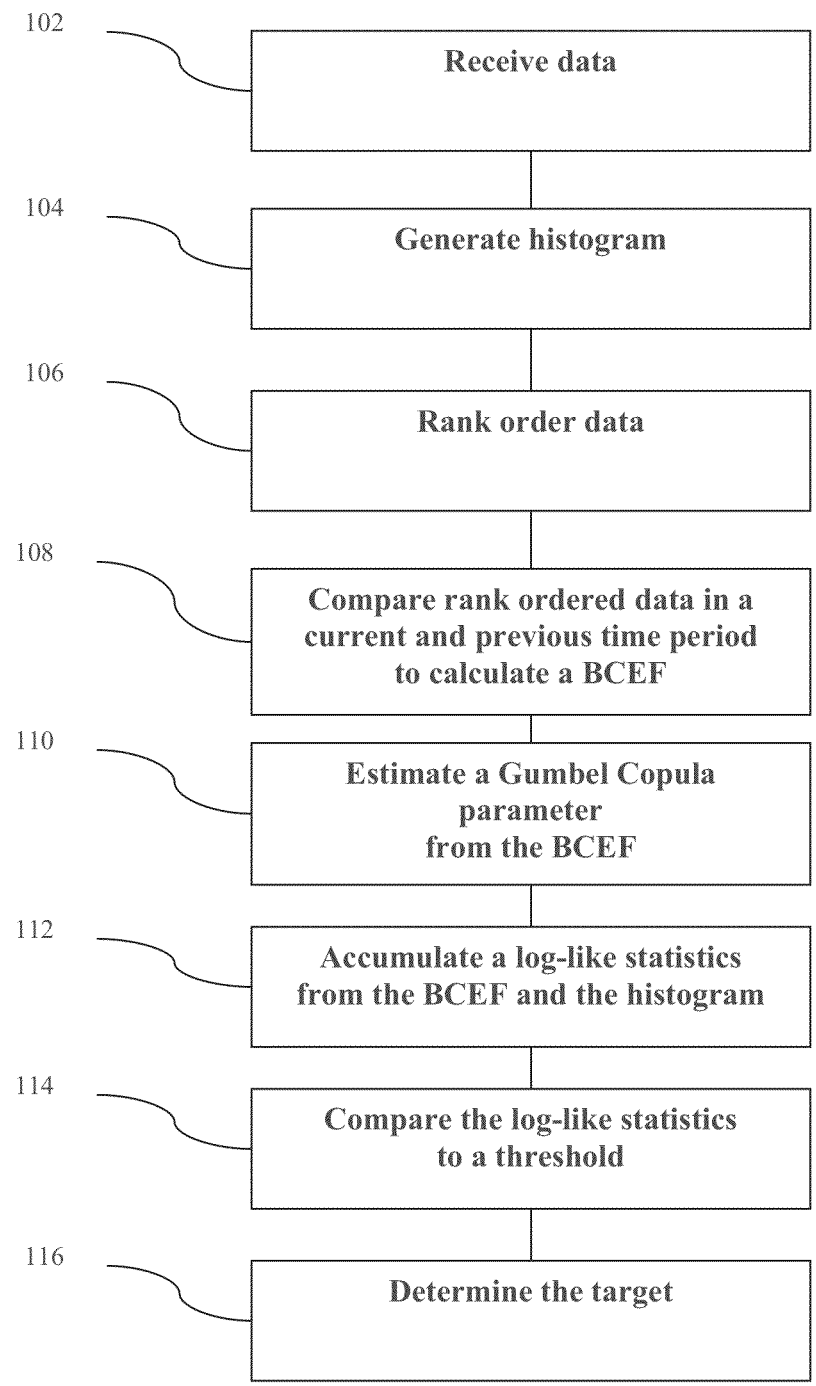
FIG. 1 shows a process flow diagram, according to some embodiments of the present invention.

FIG. 1 shows a process flow diagram, according to some embodiments of the present invention. As shown in block 102, the (image processed) data is received. In block 104, a histogram is generated from the received data by counting the number of data samples that have amplitude between the edges of a series of bins in order to estimate the probability distribution function of the amplitude. In block 106, the received data is rank ordered based on the power or amplitude of the received signal and divided by the number of data samples plus one in order to form an empirical estimate of the probability integral transform, also known as the order statistic. For example, if the incoming data is $\{3, 9, 2, 1\}$, the output of block 106 would be $\{0.6, 0.8, 0.4, 0.2\}$. The ranked data received in a current time period is then compared to ranked data received in a previous time period to calculate a Bivariate Conditional Exceedance function (BCEF), in block 108.

The BCEF is a distribution-free statistical quantity that measures upper-tail dependence and is defined as the probability of exceeding an order-statistic threshold given that a previous observation exceeded the same order-statistic threshold. In particular, an order statistic q is chosen (typically greater than 0.9), and the probability that the order statistic of the data in a given resolution cell at the current time is greater than q, given that the order statistic at the previous time was also greater than q is calculated, giving the BCEF, denoted B(q).

In block 110, the calculated BCEF is used to estimate a Gumbel Copula parameter. In general, a copula C(u,v) is a distribution-free statistical quantity that gives the joint probability that U<u and V<v, where U and V are two uniformly distributed variables on the interval [0, 1]. For arbitrarily distributed random variables, the original data can be replaced by the probability integral transform, which is estimated in block 106. The bivariate Gumbel Copula generalizes the BCEF and interpolates between statistical independence ($\theta=1$) and perfect upper-tail dependence ($\theta=\infty$) and extends the BCEF upper tail dependence measure to all joint order statistics. The bivariate Gumbel copula is given by:

$$C_\theta(u,v) = \exp\{-[(-\log u)^\theta + (-\log v)^\theta]^{1/\theta}\} \quad (1)$$

Where u and v are on the interval [0, 1], and $\theta$ is the Gumbel copula parameter that controls the degree of upper-tail dependence. Using the properties of copulae, the conditional CDF P(u|v) is the partial derivative of $C_q$ w.r.t. v, and the conditional PDF p(u|v) is the partial derivative of P(u|v) w.r.t. u:

$$p(u|v) = \frac{\partial}{\partial u}\left(\frac{\partial}{\partial v}C_\theta(u,v)\right) = \quad (2)$$
$$\frac{1}{uv}(-\log u)^{\theta-1}(-\log v)^{\theta-1} \times \exp\{-[(-\log u)^\theta + (-\log v)^\theta]^{1/\theta}\} \times$$
$$\{[(-\log u)^\theta + (-\log v)^\theta]^{1/\theta} + \theta - 1\}[(-\log u)^\theta + (-\log v)^\theta]^{1/\theta - 2}$$

In some embodiments, u and v are the order statistics of the data at the current time and the previous time, respectively, and $p_\theta(u|v)$ is the probability of a data sample having an order statistic u at the current time, given that it had the order statistic v at the previous time and the Gumbel copula parameter is $\theta$.

Given the BCEF calculated in block 108, B(q), and the chosen order statistic threshold q, the Gumbel copula parameter is estimated by:

$$B(q) = p(v > q | u > q)BCEF, \quad (3)$$
$$q = \text{order statistic}$$
$$= \frac{p(v > q, u > q)}{p(u > q)} = \frac{1 - C_\theta(1, q) - C_\theta(1, q) + C_\theta(q, q)}{1 - q}$$
$$C_\theta(q, 1) = C_\theta(1, q) = e^{-[-\log q]} = q$$
$$C_\theta(q, q) = \exp\{-[2(-\log q)^\theta]^{1/\theta}\} = \exp\{-[2^{1/\theta}(-\log q)]\} = q^{2^{1/\theta}}$$
$$C_\theta(q, q) = q^{2^{1/\theta}} = B(q)(1 - q) + 2q - 1$$
$$\theta = \log 2\left\{\log\left[\frac{\log(B(q)(1-q) - 1 + 2q)}{\log q}\right]\right\}^{-1} \quad (4)$$

Referring back to FIG. 1, the estimated Gumbel Copula parameter and the generated histogram are then used to accumulate a log-likelihood statistic, in block 112. This approximates the compound process for background intensity data as a first-order Markov function, and assumes that the conditional probability $p(z_k|z_{k-1})$ captures the time-dependence of the data where $z_k$ and $z_{k-1}$ are the amplitudes of the data at time k and k−1, respectively. The Gumbel copula models observed upper-tail dependence in clutter backgrounds. Given an estimate of the Gumbel parameter, the conditional probability $p(z_k|z_{k-1}, \theta)$, is written as $p(z_k)p_\theta(u|v)$, $p(z_k)$ is the estimate of the probability distribution function, given by the histogram calculated in Block 104, $p_\theta(u|v)$ is the conditional probability given by the Gumbel copula, and u and v are the order statistics of $z_k$ and $z_{k-1}$ given by the output of block 106. The probability of a sequence of N amplitudes, therefore, is given by:

$$L(z_1, \ldots, z_N | \theta) = \prod_k p(z_k | z_{k-1}, \theta) \quad (5)$$

The logarithm of this quantity is calculated by accumulating the logarithm of the conditional probabilities.

Referring back to FIG. 1, in block, 114, the log-likelihood statistic is compared to a threshold value. The threshold value can be fixed at design time, or it can be adaptively changed in order to control the number of false detections. The detection of the target is determined if the log-likelihood statistic is below the threshold value, in block 116. This corresponds to detecting whether the data has the same statistical properties as the measured background.

Figure 2:
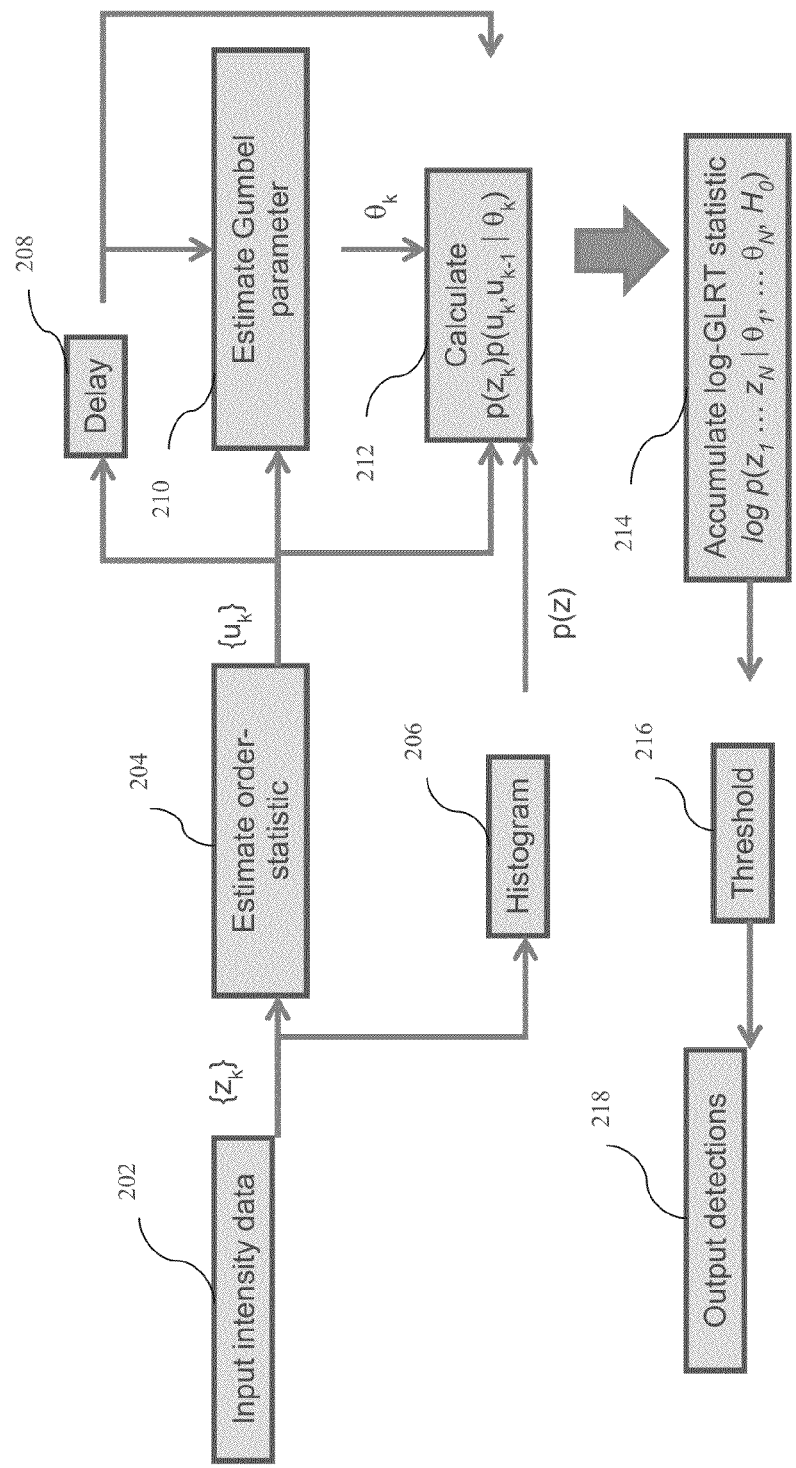
FIG. 2 shows a process flow diagram, according to some embodiments of the present invention.

FIG. 2 shows a process flow diagram, according to some embodiments of the present invention. As shown in block 202, intensity data is received from the radar at scan k denoted by $z_k$. Depending on the radar design, this data is downstream from beamforming, Doppler processing, and geographical registration. In block 204, the order statistic of each datum is estimated sorting the data with a fast sorting process that is executed on a computer and dividing the rank of each datum by the total number of input data in order to estimate u at the current time. In block 206, software (or firmware) on a computer calculates the number of data samples that have intensity between sets of two values that define the edges of the histogram bins. The values in each histogram bin are divided by the total number of samples, and an estimate of p(z) is calculated by using the value in the histogram bin that the value z falls into. The sets of values can be user-adjustable through interface software or fixed by the system.

Block 208 represents, for example, two memory buffers on a computer, where one buffer holds the output of block 204 at the current time. Block 204 alternates which buffer is written to at each time step so that one buffer holds u, and the other holds v, the output of 204 at the previous time step. Block 210 is software (or firmware) running on a computer that uses the data in both buffers in block 208 and calculates the BCEF at order statistic q (which can be user-adjustable or fixed by the system) between data at the current time and the previous time. The data samples chosen for the BCEF calculation correspond to the same geographical location or locations separated by a distance that represents a constant hypothesized target velocity. The BCEF (or set of BCEFs, if several hypothesized velocities are considered by the system) is then calculated in this way. B(q), is then used in equation (4) to calculate the single or set of Gumbel parameters, θ.

Block 212 represents, for example, software (or firmware) running on a computer that calculates $p(z_k)p_\theta(u|v)$ from the outputs of blocks 206, 208, 210 and the original input data. Block 214 represents, for example, software (or firmware) that runs on a computer that takes the logarithm of the output of block 212 and adds it to a buffer that contains the sum of the output of block 212 accumulated over the previous N−1 time steps. Block 214 also maintains buffers that contain the output of Block 212 over each of the previous N time steps, and subtracts the oldest value of the logarithm of $p(z_k)p_\theta(u|v)$ from the current sum. This forms the detection statistic for the generalized likelihood ratio test. Finally, block 216 is software (or firmware) that compares each value of the output of block 214 to a threshold. The threshold can be a fixed, user adjustable value or dynamically assigned to maintain a constant level of detections. For example, in a maritime application, the threshold can be increased or decreased depending on the environmental conditions that drive clutter false alarms, such as the significant wave height. The values that are below the threshold are declared targets and block 218 is software (or firmware) that interfaces to further downstream processing of target detections.

Figure 3:
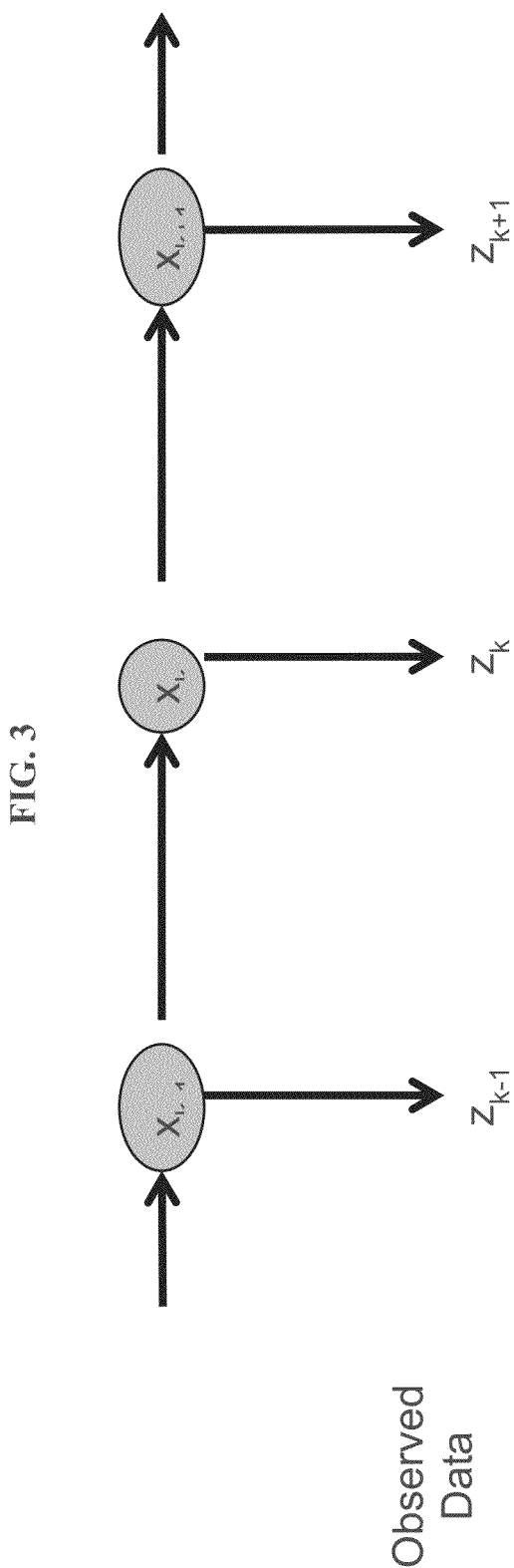
FIG. 3 shows an exemplary random process model for sea clutter, according to some embodiments of the present invention.

FIG. 3 shows an exemplary random process model for sea clutter, according to some embodiments of the present invention. Elements 302, 304, and 306 correspond to the hidden, underlying physical variables at times k−1, k, and k+1, respectively, that generate radar sea clutter. The lines connecting them correspond to the physical processes that govern their evolution. Elements 308, 310, and 312 are the observed amplitudes of the returned radar signal at times k−1, k, and k+1, respectively, and the lines connecting physical variables to observed data correspond to the physical process of radar signals scattering from the sea surface. The general process in FIG. 1 assumes that the returned radar signals are directly connected by using the conditional probability $p(z_k|z_{k-1}, \theta)$, however, this is an approximation since it is the underlying physical variables that are connected through time evolution.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for target detection in a cluttered background comprising:
   receiving input data by a radar system via an input signal, the input data including target related data and background data;
   determining power or amplitude of the received input data;
   generating a histogram from the received input data, by a processor;
   rank-ordering the received input data based on the power or amplitude of the received input data;
   comparing the ranked data received in a current time period to the ranked data received in a previous time period to calculate a Bivariate Conditional Exceedance function (BCEF) by the processor;
   utilizing the calculated BCEF to estimate a Gumbel Copula parameter;
   accumulating a log-likelihood statistic from the estimated Gumbel Copula parameter and the generated histogram to approximate a compound process for the background data;
   comparing the log-likelihood statistic with a threshold value to distinguish the back ground data from the target related data;
   determining a detection of the target, when the log-likelihood statistic is below the threshold value by the processor; and
   transmitting data related to the detection of the target for tracking the target by the radar system.

2. The method of claim 1, wherein the histogram is generated from the received data by counting the number of data samples that have amplitude between edges of a series of bins to estimate a probability distribution function of the amplitude.

3. The method of claim 1, further comprising dividing the ranked data by the number of data samples plus one to form an empirical estimate of a probability integral transform for the ordered data.

4. The method of claim 1, wherein the accumulated a log-likelihood statistic approximates a compound process for background intensity data as a first-order Markov function.

5. The method of claim 4, wherein a conditional probability of the first-order Markov function estimates a probability distribution function given by the histogram.

6. The method of claim 1, wherein the Gumbel copula models observe upper-tail dependence in clutter backgrounds.

7. The method of claim 1, wherein the threshold value is fixed.

8. The method of claim 1, wherein the threshold value is adaptively changed to control the number of false detections.

9. A method for target detection in a cluttered background comprising:
   receiving input data by a radar system via an input signal;
   determining power or amplitude of the received input data;
   generating a histogram from the power or amplitude of the received input data, by a processor;
   calculating a Bivariate Conditional Exceedance function (BCEF) from data received in a current time period and data received in a previous time period;
   accumulating a log-likelihood statistic from the generated histogram;
   determining a detection of the target from the log-likelihood statistic by a processor; and
   transmitting data related to the detection of the target for tracking the target by a radar system.

10. The method of claim 9, further comprising:
rank-ordering the received data based on power or amplitude of the received input signal; and
comparing the ranked data received in a current time period to the ranked data received in a previous time period to calculate the BCEF.

11. The method of claim 10, further comprising dividing the ranked data by the number of data samples plus one to form an empirical estimate of a probability integral transform for the ordered data.

12. The method of claim 9, wherein said accumulating a log-likelihood statistic comprises:
utilizing the calculated BCEF to estimate a Gumbel Copula parameter; and
accumulating the log-likelihood statistic from the estimated Gumbel Copula parameter and the generated histogram.

13. The method of claim 9, wherein said determining a detection of the target comprises:
comparing the log-likelihood statistic with a threshold value; and
determining said detection of the target, when the log-likelihood statistic is below the threshold value.

14. The method of claim 13, wherein the threshold value is fixed.

15. The method of claim 13, wherein the threshold value is adaptively changed to control the number of false detections.

16. The method of claim 9, wherein the histogram is generated from the received data by counting the number of data samples that have amplitude between edges of a series of bins to estimate a probability distribution function of the amplitude.

* * * * *